United States Patent
Kim et al.

(10) Patent No.: US 7,061,497 B2
(45) Date of Patent: Jun. 13, 2006

(54) MEMORY ACCESS CONTROL APPARATUS

(75) Inventors: Sung Yong Kim, Gyeonggi-Do (KR); Jong In Choi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/801,600

(22) Filed: Mar. 17, 2004

(65) Prior Publication Data

US 2004/0183805 A1   Sep. 23, 2004

(30) Foreign Application Priority Data

Mar. 19, 2003   (KR) .................. 10-2003-0017194

(51) Int. Cl.
*G09G 5/39* (2006.01)
*G09G 5/36* (2006.01)
*G06T 1/60* (2006.01)

(52) U.S. Cl. .................. 345/531; 345/530; 345/545

(58) Field of Classification Search .............. 345/531, 345/534, 536, 530, 547, 545; 711/5, 100, 711/154, 157
See application file for complete search history.

(56) References Cited

U.S. PATENT DOCUMENTS 6,075,899 A *   6/2000   Yoshioka et al. ........... 382/233
6,667,930 B1 *  12/2003   Carlton .................. 365/230.03

* cited by examiner

*Primary Examiner*—Kee M. Tung
*Assistant Examiner*—Joni Hsu
(74) *Attorney, Agent, or Firm*—Birch, Stewart, Kolasch & Birch, LLP

(57) ABSTRACT

Disclosed is a memory access control apparatus capable of writing image data in an external memory or reading the image data. The memory access control apparatus comprises a memory access control unit for storing image data in a memory by a two-dimensional array according to values of a bank, a row, and a column inside the memory where the image data is to be stored calculated on the basis of coordinate values of the image data constituting one image frame and predetermined data.

20 Claims, 6 Drawing Sheets

FIG. 3A

| Y |
| C |

| 0 | 8 | 16 | 24 | 32 | ••• | 224 | 232 | 240 | 248 |
| 1 | 9 | 17 | 25 | | | | | | |
| 2 | | | | | | | | | |
| 3 | | | 0th BANK OF Nth ROW | | | | | | |
| 4 | | | | | | | | | |
| 5 | | | | | | | | | |
| 6 | 14 | 22 | 30 | | | | | | |
| 7 | 15 | 23 | 31 | 39 | ••• | 231 | 239 | 247 | 255 |

0~255: THE NUMBER OF COLUMNS

FIG. 3B

| Y |

| 0 | 8 | 16 | 24 | 32 | ••• | 224 | 232 | 240 | 248 |
| 1 | 9 | 17 | 25 | | | | | | |
| 2 | | | | | | | | | |
| 3 | | | 0th BANK OF Nth ROW | | | | | | |
| 4 | | | | | | | | | |
| 5 | | | | | | | | | |
| 6 | 14 | 22 | 30 | | | | | | |
| 7 | 15 | 23 | 31 | 39 | ••• | 231 | 239 | 247 | 255 |

| C |

| 0 | 8 | 16 | 24 | 32 | ••• | 224 | 232 | 240 | 248 |
| 1 | 9 | 17 | 25 | | | | | | |
| 2 | | | | | | | | | |
| 3 | | | 0th BANK OF Nth ROW | | | | | | |
| 4 | | | | | | | | | |
| 5 | | | | | | | | | |
| 6 | 14 | 22 | 30 | | | | | | |
| 7 | 15 | 23 | 31 | 39 | ••• | 231 | 239 | 247 | 255 |

0~255: THE NUMBER OF COLUMNS

FIG. 4

| R |
|---|
| G |
| B |

| 0 | 32 | 64 | 96 | 128 | 160 | 192 | 224 |
|---|---|---|---|---|---|---|---|
| 1 | 33 | 65 | 67 | 129 | 161 | 193 | 225 |

| 2 |
| 3 |
| 4 |
| 5 |
| 6 |
| 7 |
| 8 |
| 9 |
| 10 |

0$^{th}$ BANK OF N$^{th}$ ROW

⋮

| 23 |
| 24 |
| 25 |
| 26 |
| 27 |
| 28 |
| 29 |

| 30 | 62 | 94 | 126 | 158 | 190 | 222 | 254 |
|---|---|---|---|---|---|---|---|
| 31 | 63 | 95 | 127 | 159 | 191 | 223 | 255 |

0~255: THE NUMBER OF COLUMNS

MEMORY ACCESS CONTROL APPARATUS

This Non-provisional application claims priority under 35 U.S.C. § 119(a) on Patent Application Ser. No.(s) 10-2003-0017194 filed in Korea on Mar. 19, 2003, the entire contents of which are hereby incorporated by reference.

BACKGROUND OF THE INVENTION

1. Field of the Invention

The present invention relates to a memory interface, and more particularly, to a memory access control apparatus capable of writing image data in an external memory or reading the image data.

2. Description of the Conventional Art

Various image display apparatuses which are recently being developed need to non-linearly format-convert image data, that is not only in a horizontal direction but also in a vertical direction. As an application of the format-conversion, there are a pincushion method, a keystone method, and etc., which can be applied to various display apparatuses.

For example, in an image display apparatus such as a projector for projecting an image on a screen, when an image is displayed on a screen, a phenomenon that an image displayed on the screen is non-linearly distorted by the screen or by an optical mechanism limit is generated. Also, in an image display apparatus based on a general brown tube, an image distortion is not generated at the center of the brown tube by a screen of a curved surface but an image distortion is generated in an edge direction of the brown tube. According to this, the image display apparatus reverse-converts the distorted image into the original image in an additional format conversion process block for compensating a partial distortion of the image. According to this, an actual image displayed on the screen is normally realized without a distortion, so that the user can see an image in an optimum state.

The image display apparatus outputs image data non-linearly when an image is to be displayed on the screen thus to display the original image on the screen without distortion. Functions for non-linearly processing image data include a tilt function, a pincushion function, a keystone function, etc., which are also known as a warping function. In order to implement the warping function, the image data has to be accessed to an external memory in a vertical direction or a horizontal direction.

However, in the conventional memory access control apparatus, the warping function is performed by storing the image data in an external memory in a horizontal direction by a raster scan method and then reading the stored image data in a horizontal direction. Therefore, in the conventional memory access control apparatus, a memory access latency becomes very great thus not to be able to smoothly read image data from the external memory, thereby lowering the stability of the entire system. Hereinafter, a process for storing image data in the external memory in accordance with the conventional art will be explained with reference to FIG. 1.

FIG. 1 is a view for explaining a storage principle of image data in a memory access control apparatus in accordance with the conventional art.

As shown, the conventional memory access control apparatus stores inputted image data by sequentially increasing a column address inside the external memory. That is, since the conventional memory access control apparatus consecutively processes the image data as an image line unit, a bank change of the external memory is not generated when the image data stored in the external memory is to be accessed in a horizontal direction of an image frame. According to this, the image data can be processed with a minimum memory access latency.

In the conventional memory access control apparatus, since a minimum memory access latency is used when adjacent image data stored in the external memory are accessed, a function of the entire system can be enhanced. Herein, the memory access latency is a delay time generated when image data stored in different banks and rows of the external memory are accessed, and can be represented as the number of memory operation clocks.

However, in the conventional memory access control apparatus, a considerable memory access latency is generated when image data sequentially stored in the external memory is read in a vertical direction of the image frame.

For example, when an interlaced scanning image of 512 k×64-bit×4 banks SDRAM is accessed, 8 pixel data, that is, 8 bytes are stored in one column in the conventional memory access control apparatus. Therefore, in order to store one image line inside one image frame in the SDRAM, 240 (1920/8) columns are necessary. Generally, the $N^{th}$ bank of the $N^{th}$ row inside a memory has 256 columns, so that said one image line can be stored in the $N^{th}$ bank of the $N^{th}$ row inside the memory. Herein, said 8 pixel data is defined as one word.

In the conventional memory access control apparatus, when the memory where the image data is stored as 32 words is accessed, a bank change is performed at each image line in order to bring the stored image data in a vertical direction of the stored image frame. In a process for sending a command for the bank change request to the SDRAM interface, a certain number of memory access latencies (for example, 6 clocks) are generated. That is, if the number of clocks necessary to access one word is 1, 32 clocks are required to bring 32 word data. Nevertheless, the number of clocks of the memory access latency generated during the bank change of 32 times is 191 (6(the number of clocks)×32 times−1 (the number of clocks)). According to this, in the conventional memory access control apparatus, a memory access efficiency of the entire system is greatly degraded, so that a high efficiency of a memory access of the entire system can not be ensured with the existing method.

As aforementioned, in the conventional memory access control apparatus, image data constituting one image frame is sequentially stored in the external memory by one-dimensional array method, so that the memory access latency for accessing image data of various display apparatuses in a vertical direction is increased.

SUMMARY OF THE INVENTION

Therefore, an object of the present invention is to provide a memory access control apparatus capable of optimally controlling a memory access latency for various display apparatuses by calculating a bank, a row, and a column of a memory where image data is to be stored based on a coordinate value of image data constituting one image frame and predetermined data.

To achieve these and other advantages and in accordance with the purpose of the present invention, as embodied and broadly described herein, there is provided a memory access control apparatus comprising: a memory access control unit for storing image data in a memory by a two-dimensional array according to values of a bank, a row, and a column of the memory where the image data is to be stored calculated on the basis of coordinate values of the image data constituting one image frame and predetermined data.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 3A and 3B are views showing a memory structure where image data of Y and C components are arranged;

FIG. 4 is a view showing a memory structure where image data of R, G, and B components are arranged;

DETAILED DESCRIPTION OF THE PREFERRED EMBODIMENTS

Reference will now be made in detail to the preferred embodiments of the present invention, examples of which are illustrated in the accompanying drawings.

Hereinafter, will be explained a memory access control apparatus capable of optimally controlling a memory access latency for various display apparatuses by calculating a bank, a row, and a column of a memory where image data is to be stored based on a coordinate value of image data constituting one image frame and predetermined data.

Figure 1:
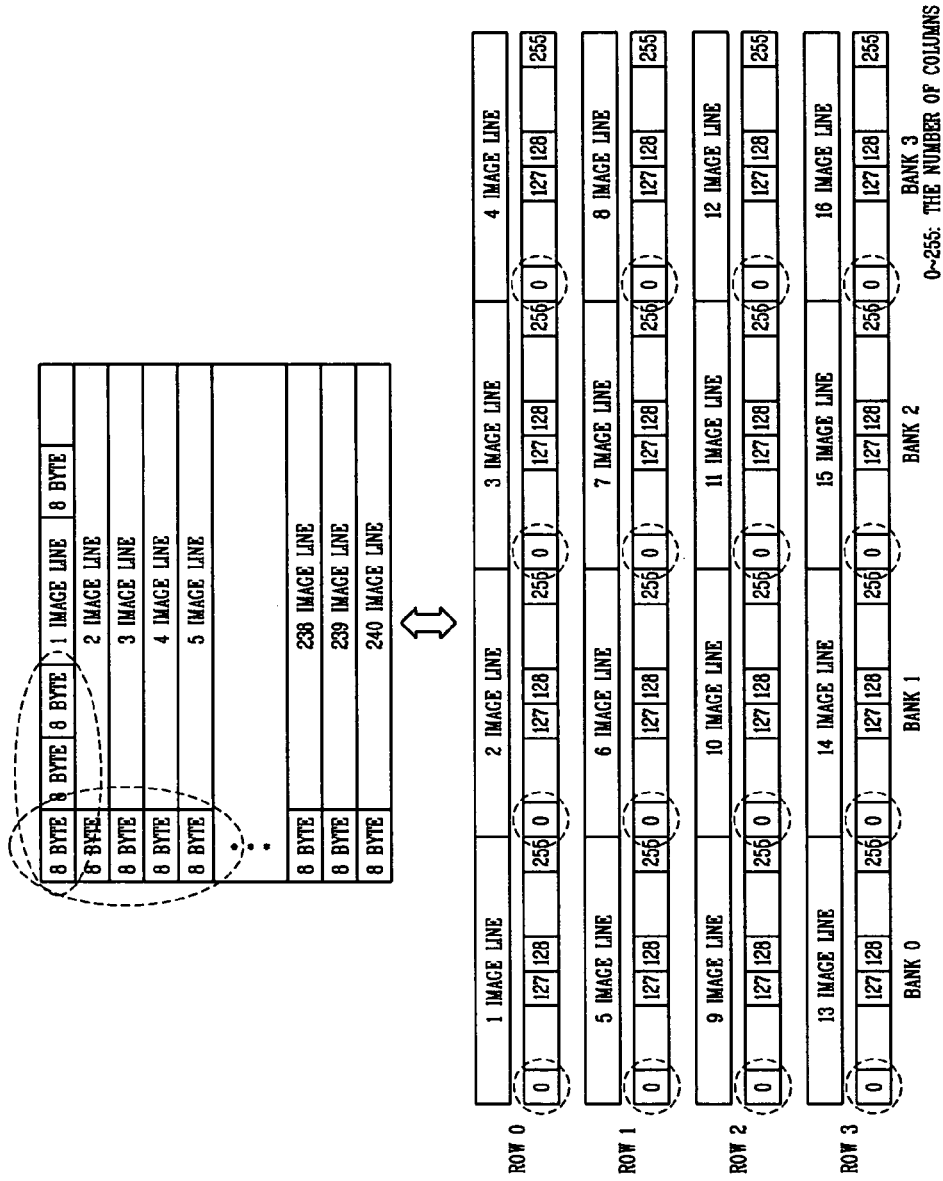
FIG. 1 is a view for explaining a storage principle of image data in a memory access control apparatus in accordance with the conventional art.
Figure 2:
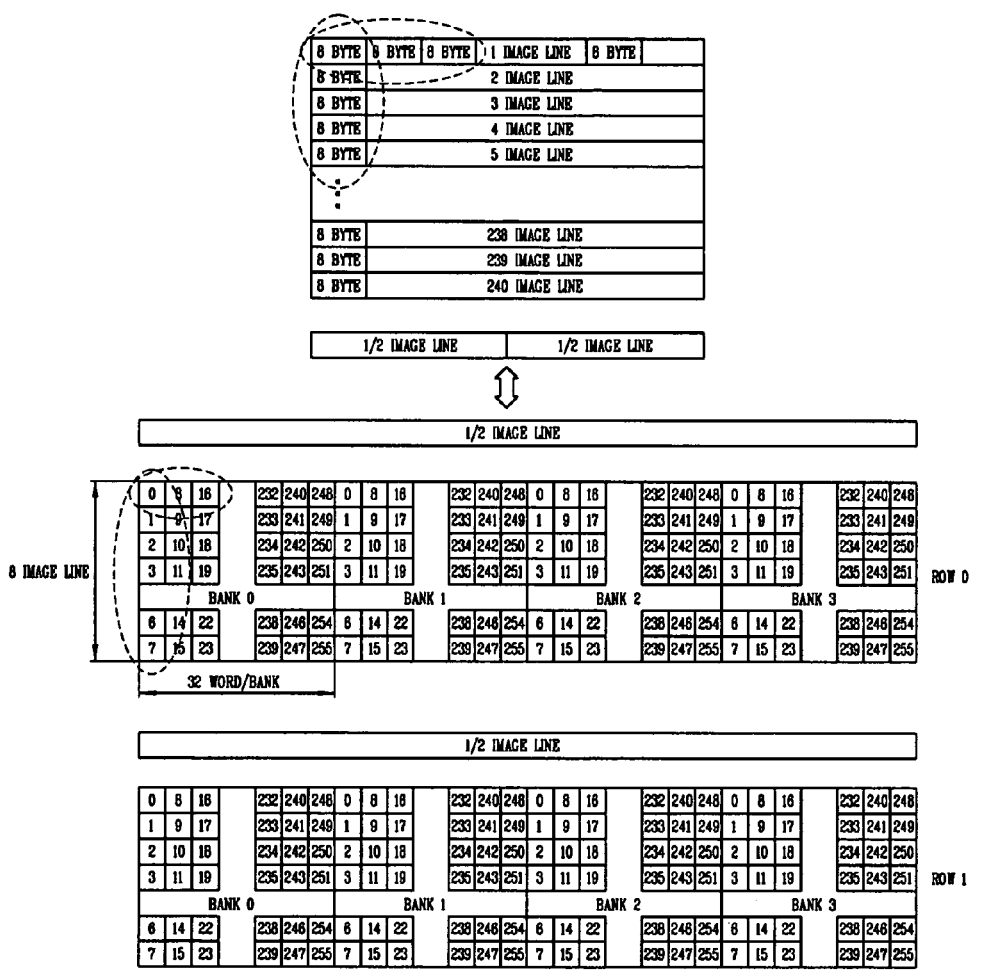
FIG. 2 is a view for explaining a storage principle of image data in a memory access control apparatus according to the present invention.

FIG. 2 is a view for explaining a storage principle of image data in a memory access control apparatus according to the present invention.

As shown, in the memory access control apparatus according to the present invention, image data constituting one image frame is stored in the $N^{th}$ bank of the $N^{th}$ row in an external memory by a two-dimensional array method, so that the image data stored in the external memory can be accessed in a horizontal direction or a vertical direction with an optimum memory access latency.

A principle for storing the image data of the memory access control apparatus according to the present invention will be explained as follows.

The inputted image data is divided into image lines respectively constituted with 256 words by regarding 8 bytes as one word. The image data of each image line is stored in a predetermined position of the external memory as a word unit.

Herein, the number of words that can be stored in one line in the $N^{th}$ bank of the $N^{th}$ row inside the memory is defined a word per bank, and the number of lines that can be included in the $N^{th}$ bank of the $N^{th}$ row inside the memory is defined as a unit line.

For example, in the external memory for storing the image data, first image data of 8 bytes of the image lines is sequentially stored in the first column in the $N^{th}$ bank of the $N^{th}$ row in a vertical direction, and second image data of 8 bytes of the image lines is sequentially stored in the second column also in the vertical direction. By repeating the process, 960 pixels, a half of 1920 pixels of each image line having the word per bank of 32 and the unit line of 8 are stored in the $0^{th}$, $1^{st}$, $2^{nd}$, and $3^{rd}$ banks of the $0^{th}$ row inside the external memory. Also, the remaining 960 pixels, a half of 1920 pixels of the each image line having the word per bank of 32 and the unit line of 8 are stored in the $0^{th}$, $1^{st}$, $2^{nd}$, and $3^{rd}$ banks of the $1^{st}$ row inside the external memory.

In the memory access control apparatus according to the present invention, image data constituting one image frame is stored in the $N^{th}$ bank of the $N^{th}$ row inside the external memory by a two-dimensional array method. According to this, in case of accessing image data in a vertical direction or in a horizontal direction, the image data can be accessed with an optimum memory access latency.

FIGS. 3A and 3B are views showing a memory structure where image data of Y and C components are arranged.

As shown, 8 bytes including a luminance Y and a chrominance C of an image, that is, one word unit is stored in the memory structure. Herein, FIG. 3A shows an array method for accessing image data of the Y and C components in one bank in one row, and FIG. 3B shows an array method for accessing image data of the Y and C components in a bank of different rows.

FIG. 4 is a view showing a memory structure where image data of R, G, and B components are arranged.

As shown, 8 bytes including R, G, and B components, that is, one word unit is stored in the memory structure. In case that image data of the R, G, and B components is stored in the memory structure, a garbage region that is not used may be generated in the $N^{th}$ bank of the $N^{th}$ row. However, the problem can be solved by consecutively arranging image data of the R, G, and B components.

Figure 5:
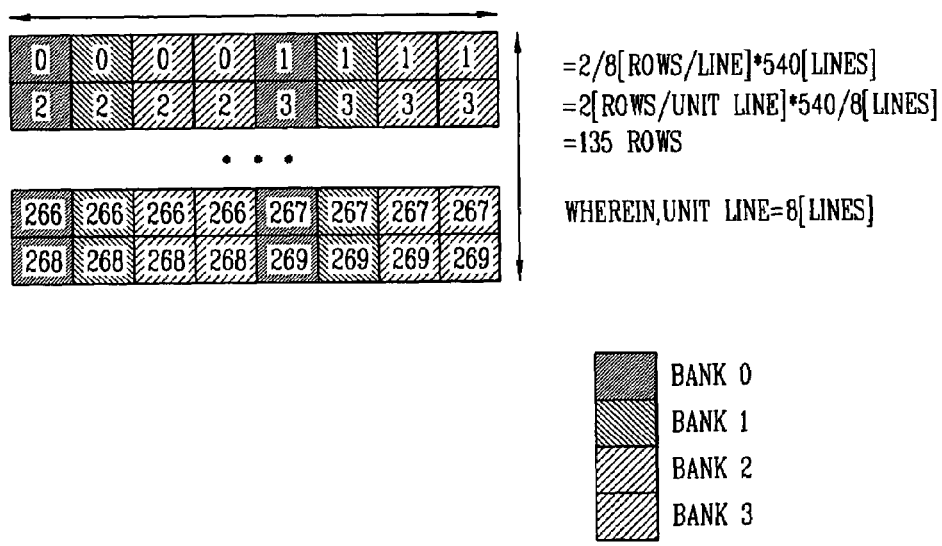
FIG. 5 is a view for explaining a principle for arranging image data of R, G, and B components of FIG. 4 in an SDRAM.

FIG. 5 is a view for explaining a principle for arranging image data of the R, G, and B components of FIG. 4 in a synchronous dynamic random access memory (SDRAM).

Referring to FIG. 5, in a 1920×1080 interlaced scanning image, image data stored in the SDRAM are stored in one unit line in one bank with 32 words, and one word is constituted with 8 pixels. Therefore, the number of rows necessary to store said one unit line in the memory is calculated as the following formula 1. The number of rows necessary to store said one unit line in the memory is defined as a row per unit line.

Row per unit line=1.875 row=1920 pixels/{8 (pixel/word)×32 (word/bank)×4(bank/row)}    [Formula 1]

The number of rows occupied by one image frame in the external memory is defined as an offset, and the offset is obtained as the following formula 2.

Offset=(vertical line/unit line)×row per unit line= (540/8)×2 (rounding off)=135 rows (rounding off)    [Formula 2]

Herein, the vertical line denotes the number of lines inside the memory where one image frame is stored.

Figure 6:
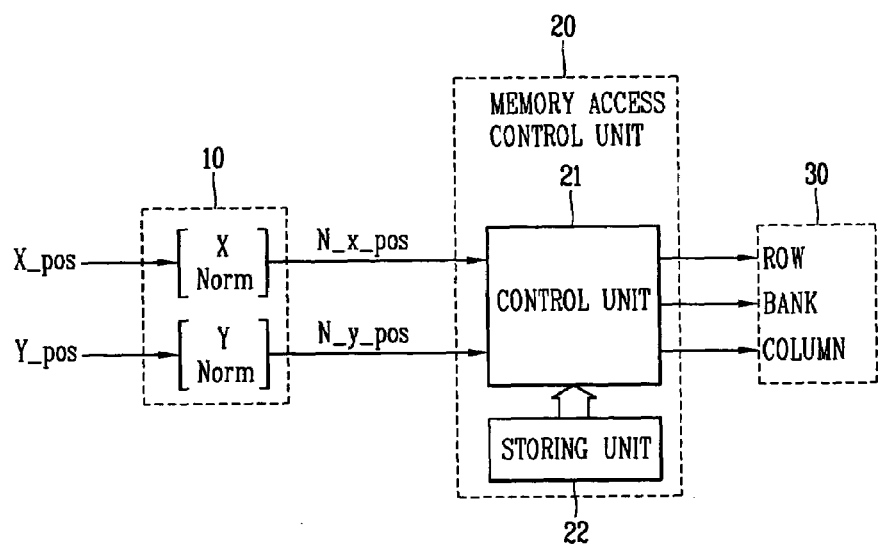
FIG. 6 is a view for obtaining a physical address for storing image data according to the present invention.

FIG. 6 is a view for explaining an operation principle of the memory access control apparatus according to the present invention.

As shown, the memory access control apparatus according to an embodiment of the present invention includes a format conversion unit 10 for converting image data into a corresponding format for performing a warping function; a control unit 21 for storing the image data in a memory by a two-dimensional array method according to values of a row, a bank, and a column inside the memory where the image data is to be stored calculated on the basis of coordinate values of the converted image data and predetermined data; and a storing unit 22 for storing the predetermined data. Herein, the predetermined data preferably includes a word per bank, a row per unit line, an offset, and a base row value. The base row denotes a start row address of one frame or one field.

A schematic construction of the memory access control apparatus according to the present invention to which a memory access control unit is applied will be explained with reference to FIG. 7.

Figure 7:
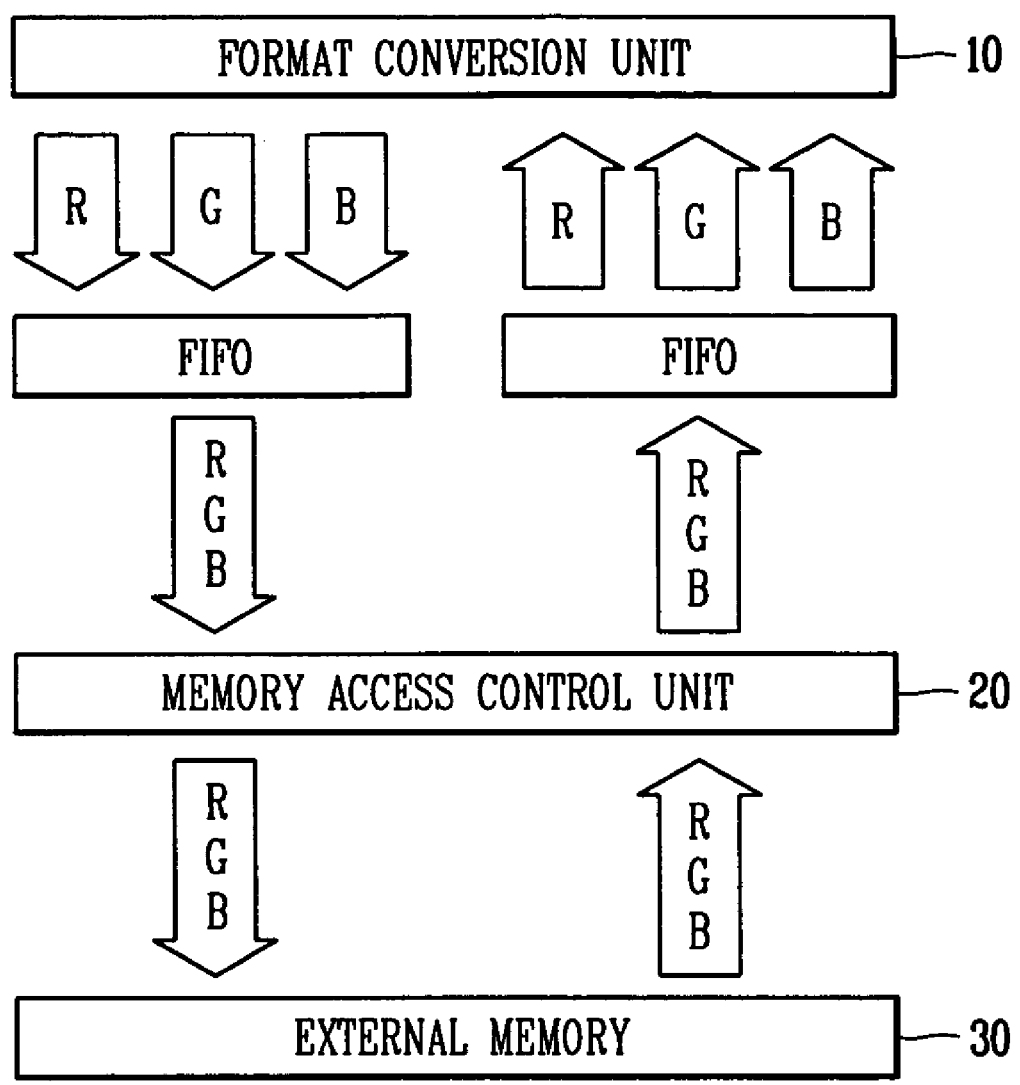
FIG. 7 is a view showing a schematic construction of the memory access control apparatus according to the present invention.

FIG. 7 is a view showing a schematic flow for accessing the R, G, and B image data of FIG. 6 to the memory.

As shown, the memory access control unit 20 temporarily stores R, G, and B image data format-converted in the format conversion unit 10 in each first in first out (FIFO) and then multiplexes thus to store in the external memory at one time. Then, the memory access control unit 20 reverse-multiplexes the R, G, and B image data stored in the external memory thus to store in said each FIFO memory, and then outputs to the format conversion unit 10.

In case that the R, G, and B image data are accessed as respective R, G, and B image data, a memory access latency is substantially increased to three times than a case that the R, G, and B image data are accessed as one unit, thereby degrading an efficiency of the entire system. That is, when a memory access latency necessary to access the image data at one time supposed to be 10, a memory access latency necessary to access the R, G, and B image data as one unit is 10 but a memory access latency necessary to respectively access the R, G, and B data is 30.

As aforementioned, in the memory access control apparatus according to the present invention, values of the row, the bank, and the column inside the memory where the image data is to be stored are calculated on the basis of coordinate values of the image data constituting one frame and predetermined data in order to realize the warping function such as a pin cushion or a keystone, thereby optimally controlling the memory access latency for various display apparatuses.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A memory access control apparatus comprising:
 a memory access control unit for storing image data in a memory by a two-dimensional array according to values of a bank, a row, and a column inside the memory where the image data is to be stored calculated on the basis of coordinate values of the image data constituting one image frame and predetermined data, wherein the predetermined data is a word per bank, a row per unit line, an offset, and a base row value.

2. The apparatus of claim 1 further comprising a storing unit for storing the predetermined data.

3. The apparatus of claim 1, wherein the word per bank is the number of words stored in each line of the $N^{th}$ bank of the $N^{th}$ row inside the memory.

4. The apparatus of claim 1, wherein the row per unit line is the number of rows inside the memory where one image line inside one image frame is stored.

5. The apparatus of claim 4, wherein the unit line is the number of lines stored in the $N^{th}$ bank of the $N^{th}$ row inside the memory.

6. The apparatus of claim 1, wherein the offset is obtained by multiplying a vertical line/a unit line to a row per unit line.

7. The apparatus of claim 6, wherein the vertical line is the number of lines inside the memory where one image frame is stored.

8. The apparatus of claim 6, wherein the unit line is the number of lines stored in the $N^{th}$ bank of the $N^{th}$ row inside the memory.

9. The apparatus of claim 1, wherein the base row value is a start row address of one image frame.

10. The apparatus of claim 1, wherein the memory access control unit stores image data of a horizontal direction inside said one image frame in the $N^{th}$ row inside the memory in a horizontal direction, and stores image data of a vertical direction inside said one image frame in the $N^{th}$ row inside the memory in a vertical direction.

11. The apparatus of claim 10, wherein the memory access control unit stores image data of 256 words in the $N^{th}$ bank of the $N^{th}$ row inside the memory.

12. The apparatus of claim 11, wherein the memory access control unit stores the image data in the $N^{th}$ bank of the $N^{th}$ row inside the memory so that a word per bank can be 32 and a unit line can be 8.

13. A method for storing image data for an image in a memory wherein the memory includes a plurality of banks, comprising:
 storing the image data in a plurality of memory banks, wherein
  pixel data for each horizontal line of the image are stored in two or more memory banks, and
  pixel data for each vertical line of the image are stored such that at least one memory bank includes two or more pixel data of the vertical line; and
 mapping each pixel data of the image data to a particular memory bank and row and column within the particular memory bank,
 wherein the step of mapping each pixel includes
  determining rows per unit line, wherein the rows per unit line is defined as a number of rows of each memory bank needed to store one horizontal line of image data; and
 mapping each pixel based on the rows per unit line, and
 wherein the rows per unit line is based on a number of pixels in the one horizontal line of image data, a number of pixel data storable per column of the memory bank, a number of columns per memory bank, and a number of memory banks per row.

14. The method of claim 13, wherein the rows per unit line is calculated as A/(B*C*D), wherein A is the number of pixels in the one horizontal line of image data, B is the number of pixel data storable per column of the memory bank, C is the number of columns per memory bank, and D is the the number of memory banks per row.

15. The method of claim 13, wherein the step of mapping each pixel further comprises:
   determining an offset, wherein the offset is defined as a number of rows of each memory bank occupied by the image data; and
   mapping each pixel also based on the offset.

16. The method of claim 15, wherein the offset is based on
   a number of pixels in one vertical line of image data,
   a number of pixel data storable per line of memory bank,
   the rows per unit line.

17. The method of claim 16, wherein the offset is calculated as (E/F)*G, wherein E is the number of pixels in one vertical line of image data, F is the number of pixel data storable per line of memory bank, and G is the rows per unit line.

18. The method of claim 16, wherein the pixel data comprises one of
   luminescence and chrominance values, or
   red, green, and blue color values.

19. A method for storing image data for an image in a memory wherein the memory includes a plurality of banks, comprising:
   storing the image data in a plurality of memory banks, wherein
      pixel data for each horizontal line of the image are stored in two or more memory banks, and
      pixel data for each vertical line of the image are stored such that at least one memory bank includes two or more pixel data of the vertical line;
   mapping each pixel data of the image data to a particular memory bank and row and column within the particular memory bank,
   wherein the step of mapping each pixel includes
      determining rows per unit line, wherein the rows per unit line is defined as a number of rows of each memory bank needed to store one horizontal line of image data;
      mapping each pixel based on the rows per unit line;
      determining an offset, wherein the offset is defined as a number of rows of each memory bank occupied by the image data and is calculated as (E/F)*G, wherein E is the number of pixels in one vertical line of image data, F is the number of pixel data storable per line of memory bank, and G is the rows per unit line; and
      mapping each pixel also based on the offset.

20. The method of claim 19, wherein the pixel data comprises one of luminescence and chrominance values, or red, green, and blue color values.

* * * * *